US011137017B2

(12) United States Patent
Koop et al.

(10) Patent No.: US 11,137,017 B2
(45) Date of Patent: Oct. 5, 2021

(54) SUCTION CUP MOUNT

(71) Applicant: Bracketron, Inc., Edina, MN (US)

(72) Inventors: Anthony David Koop, Minneapolis, MN (US); Andrew Chow, Hugo, MN (US); Wonsik Oh, Hwasung-si (KR)

(73) Assignee: BRACKETRON, INC., Edina, MN (US)

( * ) Notice: Subject to any disclaimer, the term of this patent is extended or adjusted under 35 U.S.C. 154(b) by 0 days.

(21) Appl. No.: 15/062,342

(22) Filed: Mar. 7, 2016

(65) Prior Publication Data

US 2016/0258473 A1    Sep. 8, 2016

Related U.S. Application Data

(60) Provisional application No. 62/180,910, filed on Jun. 17, 2015.

(30) Foreign Application Priority Data

Mar. 5, 2015   (KR) .......................... 10-2015-0030928

(51) Int. Cl.
F16B 47/00 (2006.01)
F16M 13/02 (2006.01)

(52) U.S. Cl.
CPC ........... *F16B 47/00* (2013.01); *F16M 13/022* (2013.01)

(58) Field of Classification Search
CPC ....... F16B 47/00; F16B 47/006; F16M 13/00; F16M 13/002; B60R 2011/0056; B60R 2011/0068

USPC ....... 248/205.5–206.4, 683, 537, 309.3, 362, 248/363
See application file for complete search history.

(56) References Cited

U.S. PATENT DOCUMENTS

| 1,228,649 | A | * | 6/1917 | Childs | .................... B60R 11/00 116/35 R |
| 2,815,919 | A | * | 12/1957 | Pribil | ...................... F16B 47/00 248/363 |
| 3,154,306 | A | * | 10/1964 | Elliott | .................. B65H 3/0883 271/106 |
| 4,356,989 | A | * | 11/1982 | Ireland | .................. B25B 11/007 248/205.9 |
| 4,852,926 | A | * | 8/1989 | Littell | .................. B25J 15/0616 294/189 |

(Continued)

FOREIGN PATENT DOCUMENTS

EP         3064788 A1 *  9/2016  ............ F16B 47/003
WO    WO-2017082604 A1 *  5/2017  .............. F16B 47/00

*Primary Examiner* — Jonathan Liu
*Assistant Examiner* — Guang H Guan
(74) *Attorney, Agent, or Firm* — Daniel J. Polglaze; Westman, Champlin & Koehler, P.A.

(57) ABSTRACT

A suction mounting device includes a unitary body of soft or rigid plastic having an interior and an exterior portion connected by a hinge. The exterior portion is movable between first and second positions about the hinge, the first position a pre-mounting position in which a gel material of the exterior portion contacts a mounting surface to form a cavity between the mounting device and the mounting surface, and a second mounting position in which the exterior portion is rotated about the hinge toward the mounting surface to create a larger cavity and a partial vacuum therein to hold the suction device to the mounting surface.

6 Claims, 7 Drawing Sheets

(56) References Cited

U.S. PATENT DOCUMENTS

| | | | | |
|---|---|---|---|---|
| 5,011,316 A * | 4/1991 | Damon | ................. | A47K 5/05 |
| | | | | 248/206.3 |
| 5,039,045 A * | 8/1991 | Adams | ................. | A45D 42/14 |
| | | | | 248/206.2 |
| 5,595,364 A | 1/1997 | Protz, Jr. | | |
| 5,624,091 A | 4/1997 | Protz, Jr. | | |
| D421,213 S | 2/2000 | Addi | | |
| 6,308,923 B1 | 10/2001 | Howard | | |
| 7,066,434 B2 * | 6/2006 | Kwok | ................. | F16B 47/006 |
| | | | | 248/205.5 |
| 7,628,362 B2 * | 12/2009 | Song | ................. | F16B 47/003 |
| | | | | 248/205.5 |
| 7,775,490 B2 | 8/2010 | Kawabata | | |
| 7,850,891 B2 | 12/2010 | Ilda et al. | | |
| 7,878,467 B2 | 2/2011 | Chen et al. | | |
| 8,141,829 B2 * | 3/2012 | Hutter, III | ............. | F16B 11/006 |
| | | | | 24/304 |
| 8,196,790 B2 * | 6/2012 | Iida | ................. | B29C 45/1615 |
| | | | | 224/482 |
| 8,251,323 B2 * | 8/2012 | Liu | ................. | F16B 47/00 |
| | | | | 248/205.5 |
| 8,348,216 B2 | 1/2013 | Hajianpour | | |
| 8,356,781 B2 | 1/2013 | Chen et al. | | |
| 8,783,634 B2 * | 7/2014 | Summers | ................. | F16B 47/00 |
| | | | | 248/205.5 |
| 8,876,072 B2 | 11/2014 | Hsu et al. | | |
| 9,016,512 B2 * | 4/2015 | Ichikawa | ............. | B65D 25/101 |
| | | | | 220/624 |
| 9,488,214 B2 * | 11/2016 | Orban | ................. | F16B 47/00 |
| 2007/0200037 A1 * | 8/2007 | Nan | ................. | A61H 19/44 |
| | | | | 248/205.5 |
| 2016/0258473 A1 * | 9/2016 | Koop | ................. | F16M 13/022 |
| 2016/0305468 A1 * | 10/2016 | Koo | ................. | F16M 13/022 |

* cited by examiner

SUCTION CUP MOUNT

PRIORITY CLAIM

This application claims priority to U.S. Provisional Application Ser. No. 62/180,910, filed Jun. 17, 2015, and to Korean Application 10-2015-0145865, filed Mar. 5, 2015.

BACKGROUND

The present disclosure relates to mounts used to secure devices to surfaces, and in particular the present disclosure relates to re-usable mounting devices used to secure mounts to a surface, such as for securing mobile devices and the like.

Suction cup mounts are available for mounting of devices and the like. However, such suction cup devices have issues with remaining securely fastened to a mounting surface, especially for a long period of time.

For example, cone shaped cup mounts may be made of a soft rubber or plastic material. When the cup mount is positioned where it is desired to be mounted to a surface, suction is engaged by a user pushing down on a center of the cone, and forcing air out from the space between the surface and the mount material, creating a partial vacuum that assists in retaining the mount to the surface. Once the cup mount is depressed, creating the partial vacuum, it is in a non-resting position. That is, the cup mount is deformed to a position in which it stores some energy that acts to return the cup mount to its naturally resting position. As air inevitably leaks back under the cup mount, the air pressure in the partial vacuum will begin to equalize with the external atmospheric pressure. A deformed suction cup has a tendency also to return to its rest position. This can increase the speed at which the suction cup partial vacuum lets external air back in, since a restoration of a rest shape of the suction cup may aid in deteriorating the connection between the mounting cup and the mounting surface.

To at least partially overcome this issue, some suction cups include hard plastic caps and retainer rings to attempt to increase the amount of time it takes for the suction cup to lose a sufficient amount pressure differential between the partial vacuum and external atmospheric pressure to allow the connection between the cup mount and the mounting surface to be broken. Such configurations can make the mount hold longer, but are limited to use on mounting surfaces that are very smooth, such as glass or glazed tile. Further, the use of such additional structure adds significant cost and complexity to the mount itself. Also, accessory mounting becomes more difficult as additional structure is used on the mount.

Some other suction devices use a flat pad made of silicon, soft plastic or gel material. These pads stick to the mounting surface but require a mechanism of some sort to pull up from their center, creating a partial vacuum between the mounting surface and the pad. Mechanisms of this type are typically in the form of a lever or screw control, with a plunger or a screw attached to the center, that pulls the pad up when the lever or screw control is turned. These types of suction cups work significantly better on textured non-porous surfaces than traditional cone-shaped suction cups, as well as on smooth surfaces. However, the lever and internal mechanisms of such mounts are expensive and complex, requiring multiple moving parts. Further, the soft pad material tends to stretch and deform over time causing the device to become less effective. Still further, since the lever must be accessible for mounting and releasing the mount, it is difficult to add accessories to mounts of this type.

SUMMARY

An aspect of the present disclosure is directed to a suction device including a unitary body having a center main body portion and an exterior body portion, the center main body portion and the exterior body portion connected by a hinge, and a gel material coating on a side of the exterior body portion. In one aspect, the exterior body portion is movable between a first position in which the center main body portion and the exterior body portion form a convex shape with respect to the side of the exterior body portion, and a second position in which the center main body portion and the exterior body portion form a concave shape with respect to the side of the exterior body portion.

Another aspect of the present disclosure is directed to a suction device including a circular mount body including an interior section and an exterior section radially separated from the interior section by a circular hinge, and a gel material coating a side of the exterior section and configured to engage a mounting surface. In one aspect, the exterior section is movable between a first pre-mounting position in which the exterior section extends away from the mounting surface and a second mounted position in which the exterior section engages the mounting surface.

Another aspect of the present disclosure is directed to a method of mounting a suction mount to a surface including placing a mount having a center section and an exterior section radially separated from the interior section by a circular hinge in a first pre-mounting position on the surface, the first pre-mounting position configured to extend the exterior section away from the surface, and moving the exterior section to a mounting position, wherein the mounting position is a position in which the exterior section is rotated about the hinge.

Another aspect of the present disclosure is directed to a suction device including a unitary body having a center main body portion and an exterior body portion, the center main body portion and the exterior body portion connected by a hinge, and a gel material coating on a side of the exterior body portion. The exterior body portion is bendable about the hinge, and wherein the gel material forms a convex shape toward the center main portion in a first, pre-mounting position, and a substantially flat shape in a second, mounted position.

Other aspects that may be combined with one or more of the above aspects include the unitary body being disc-shaped, the hinge being a circular hinge, the unitary body or circular mount body being formed from a soft or rigid plastic material, having a number of molded internal openings therein, the internal openings positioned substantially perpendicular to the hinge, and configured to assist movement of the exterior body portion between the first and the second positions, and/or having a mount head configured to mount a device thereto.

DETAILED DESCRIPTION

One embodiment of the present disclosure is directed to suction cup mounts that are removably mountable to a surface. In various embodiments, suction mounting devices may include a unitary body of a plastic material having an interior and an exterior portion connected by a hinge. The exterior portion is movable between first and second positions about the hinge, the first position a pre-mounting position in which a gel material of the exterior portion contacts a mounting surface to form a cavity between the mounting device and the mounting surface, and a second mounting position in which the exterior portion is rotated about the hinge toward the mounting surface to create a larger cavity and a partial vacuum therein to hold the suction device to the mounting surface.

Figure 1:
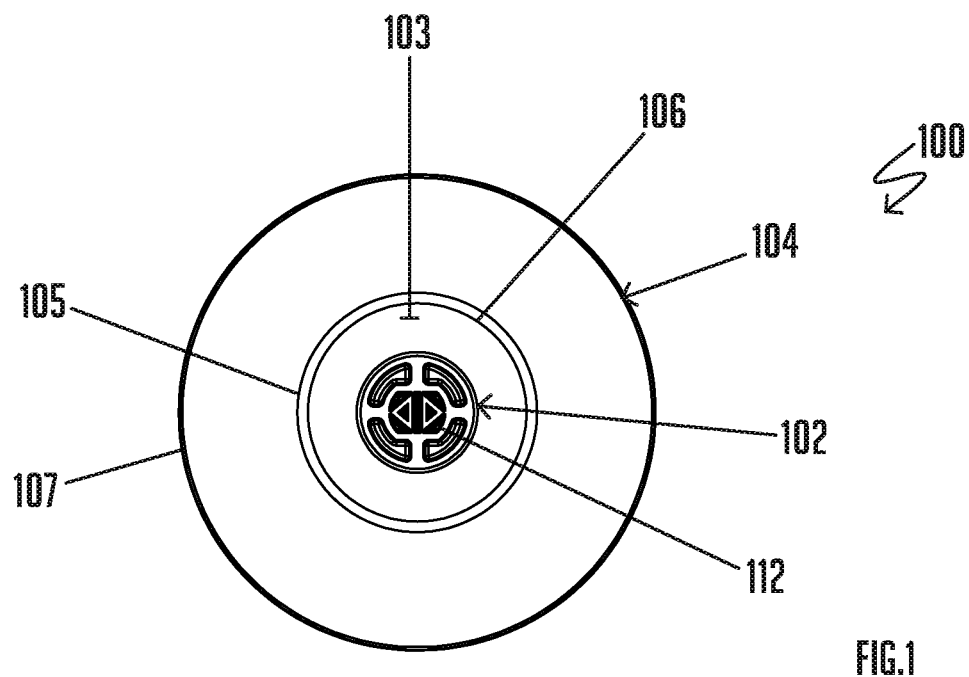
FIG. 1 is a top view of a suction mount according to an embodiment of the present disclosure.
Figure 2:
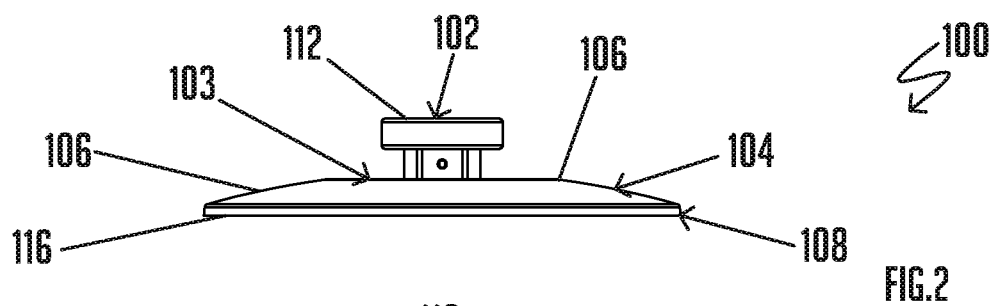
FIG. 2 is a side elevation view of the suction mount of FIG. 1.
Figure 3:
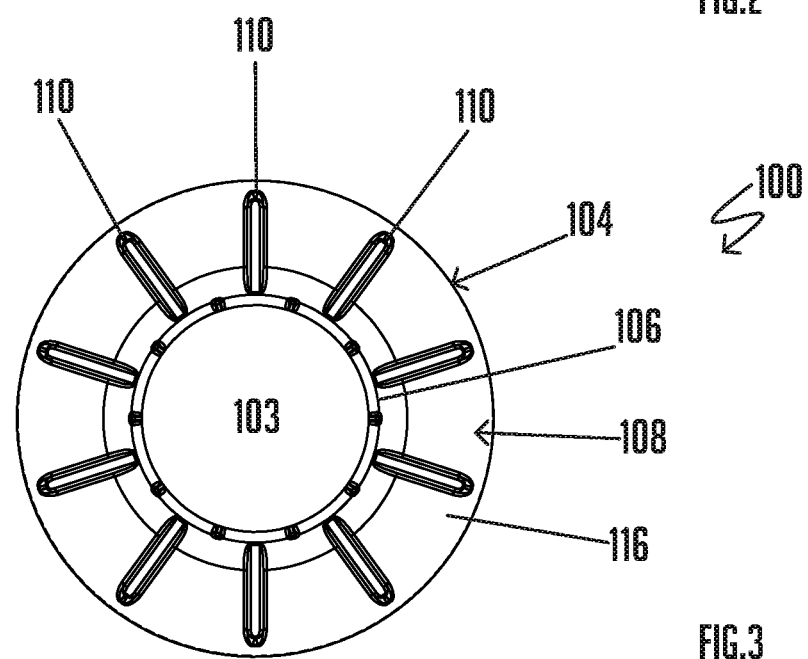
FIG. 3 is a is a bottom view of the suction mount of FIG. 1.

FIGS. 1-3 show, respectively, top, side elevation, and bottom views of a mount 100 according to one embodiment of the present disclosure. Mount 100 comprises in one embodiment a unitary body 102 molded in soft or rigid plastic material (in one embodiment polycarbonate), and a gel material 108 coated to a portion of the unitary body 102 on a first side 111 thereof. Unitary body 102 further comprises a main center body portion 103 connected to an exterior body portion 104 by a circular hinge 106, and a mount head 112 formed on the main center body portion. Polycarbonate is a plastic that is capable of undergoing large plastic deformations without cracking or breaking. The unitary body 102 of mount 100 includes main center body portion 103 and exterior body portion 104 connected by a circular hinge 106. The mount is flexible about the circular hinge 106 to allow the configuration of the mount 100 into two different positions. The mount head 112 is used in one embodiment for mounting accessories that hold or secure things ranging from soap dishes and shelves to mobile devices such as a cellular/portable telephone, tablet, book reader, global positioning system, or the like, to the mount 100. The entire structure of mount body 102 is formed as one piece in one embodiment. While polycarbonate is discussed as an option for the plastic of the unitary body, it should be understood that other plastics, including soft or rigid plastic materials, may be used for the unitary body, without departing from the scope of the disclosure.

Referring to FIG. 3, openings 110 are molded into the unitary body 102, in one embodiment internally. In one embodiment, the openings extend substantially perpendicular to the hinge 106 between the main center body portion 103 and the exterior body portion 104. The openings 110 in the body 102 allow for more easy operation of the circular hinge 106, to place the mount 100 in one of two positions (see also FIGS. 4-5). A first position (FIG. 5) in one embodiment is a normal position in which the suction mount 100 has a substantially concave cavity on a first side 111 of the body 102, such that when the suction mount 100 is placed on a surface, the concavity is facing the surface. A second position (FIG. 4) in one embodiment is a pre-mounting position in which the suction mount 100 is inverted by rotating exterior body portion 104 about circular hinge 106 to reverse the concavity such that when the suction mount 100 is placed on a surface, suction mount 100 has a substantially concave cavity on a second, opposite side 113 of the body 102. The structure of the main body 102 allows for the mount 100 to be moved from its first position to its second position, and vice versa, by pressure exerting a moment about the circular hinge 106.

In one embodiment, the unitary body 102 is circular, with the center main body portion 103 concentric with the washer-shaped exterior body portion 104 separated by circular hinge 106. The hinge 106 in one embodiment is thinner than the center main body portion 103. In one embodiment, a thickness of the exterior body portion 104 tapers, from a thickness approximately equal to a thickness of the hinge 106 at its inner edge 105 to a smaller thickness at its outer edge 107, which is in one embodiment also the outer edge of the unitary body 102. Gel coating 108 may be of uniform thickness, or may taper from the inner edge 105 to the outer edge 107, such that in one embodiment, a bottom 116 of the gel material is substantially parallel to a mounting surface such as surface 400 (FIGS. 4-5) when the mount 100 is in its first, normal position (FIGS. 2, 5).

Figure 4:
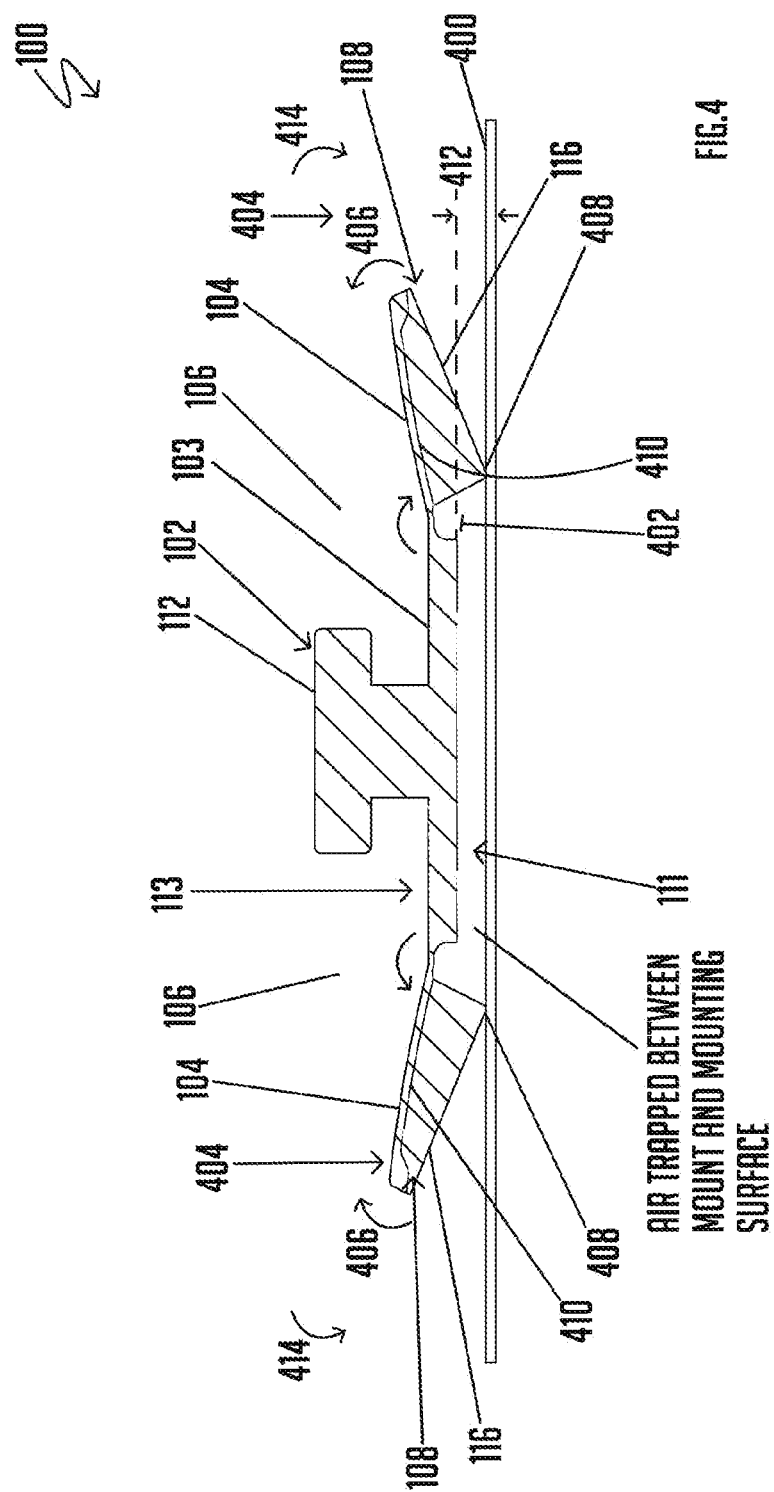
FIG. 4 is a cutaway side view of a suction cup according to an embodiment of the present disclosure, in a pre-mounting position.
Figure 5:
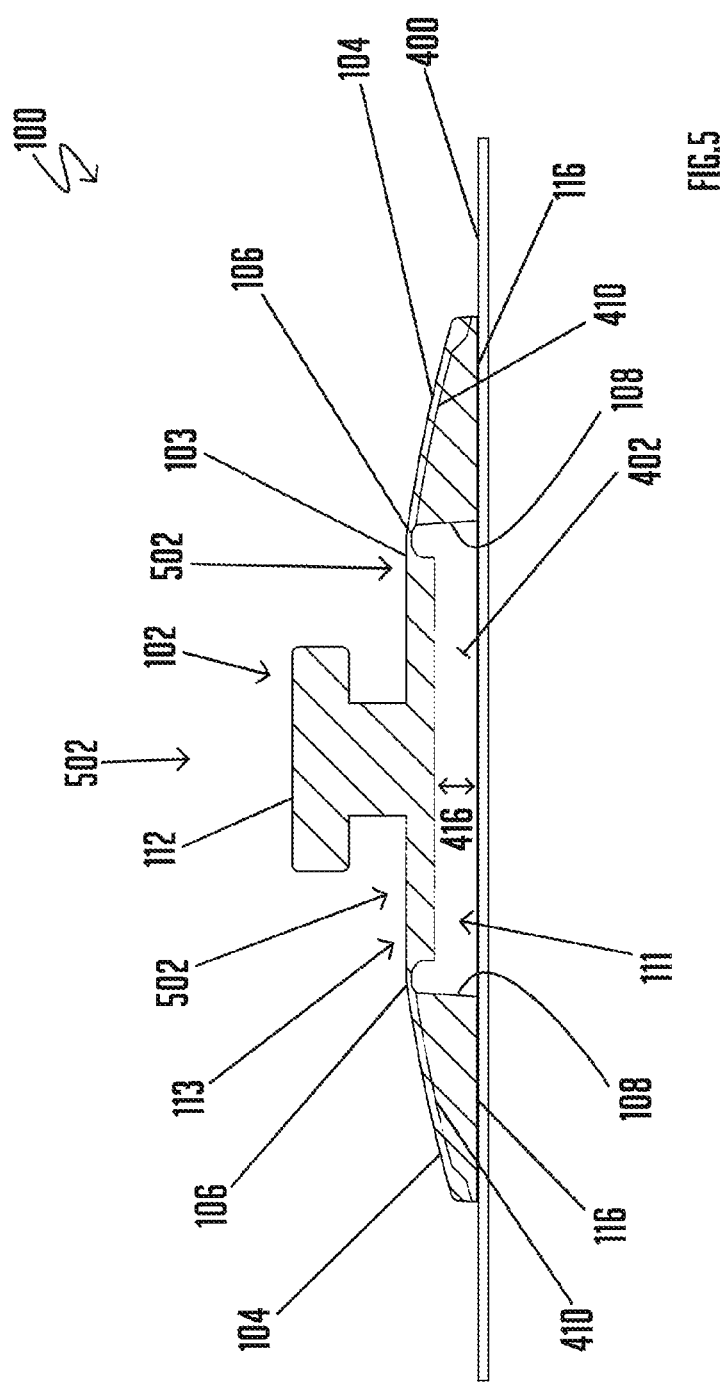
FIG. 5 is a cutaway side view of the suction cup of FIG. 4, in a mounted position.

FIG. 4 shows a mount 100 in its second, pre-mounting position in which is it ready to be mounted to a mounting surface 400. In this position, the mount body 102 has been configured to its pre-mounting position. To place the mount 100 in its pre-mounting position, the mount is essentially turned inside out. That is, pressure is exerted to snap the exterior portion 104 of the mount body 102 from a first position (as shown in FIGS. 1-3) to a second, pre-mounting position. In the pre-mounting position, the exterior body portion 104 of the body 102 is rotated about circular hinge 106 in the direction of arrows 406 to form a concave surface with respect to the side 113 of the mount 100. The body 102 snaps into its pre-mounting position. The openings 110 (shown in FIG. 3) allow for easier movement of the exterior body portion 104 of the body 102 between its first and second positions.

Figure 6:
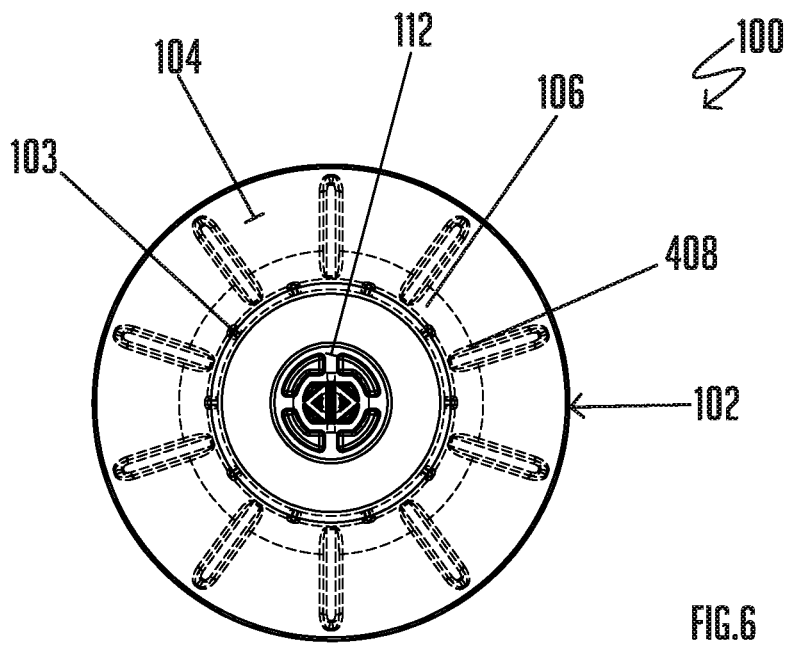
FIG. 6 is a top partially transparent view of a suction cup according to another embodiment of the present disclosure, showing a contact of gel material with a mounting surface.

Once the mount 100 is in its pre-mounting position, to mount the mount 100 to a surface such as surface 400, the mount in its pre-mounting position is placed on the surface 400. In this position, the gel material 108 that lines a bottom surface 410 of the exterior portion 104 is in contact with the surface for all or at least a significant portion of its circular contact area 408 with the surface 400. This circular contact area 408 is shown in dashed lines in FIG. 6, which is a top view of an at least partially transparent mount 100 so as to show the position of the circular hinge 106 and circular contact area 408.

The circular contact area 408 is in contact with mounting surface 400. To mount the mount 100 to the mounting surface, pressure is exerted on the exterior body portion 104 of the mount body 102, such as at arrows 404. The resiliency of the body, and its hinge 106, snaps the mount 100 to its second, mounted position. In the first position, the main center body portion 103 is at a height 412 above the surface 400, and the circular contact 408, the mounting surface 400, and the underside 111 of the mount 100 form a cavity 402 therebetween.

The mounting, that is, the snapping of the exterior portion 104 via hinge 106 and pressure on exterior body portion 104, such as at 404, snaps the exterior body portion about the hinge 106 in the direction of arrows 414. This motion also raises the main center body portion 103 to a height 416 above the surface 400. In this motion, the cavity 402 is expanded by the snapping of the mount from its pre-mounting position as shown in FIG. 4 to its mounted position as shown in FIG. 5.

The cavity 402 between the mounting surface and the mount body 102 contains a certain amount of air. When the hinge 106 is snapped to its second position, the main center body portion 103 of mount 100 is elevated to a height 416 above the mounting surface 400 which is greater than its height 412 above the mounting surface in the pre-mounting position. The volume of the cavity 402 between the mounting surface 400 and the interior surface of the mount body 102 is larger after the mount 100 is snapped from its pre-mounting position to its mounted position. As the volume of cavity 402 is larger after the mount 100 is snapped to its mounted position that it was when the mount 100 is in its pre-mounting position, and as the amount of air in the cavity 402 is the same, a partial vacuum is created by the snapping of the mount 100 from its pre-mounting position to its mounted position. No air is forced out of the cavity 402, but the amount of air in the cavity 402 remains the same as the volume of cavity 402 is increased. Accordingly, the partial vacuum in the cavity 402 is at a lower pressure than the air external to the cavity 402, and air pressure holds the mount 100 to the mounting surface. Further, in its mounted position, mount 100 is not in any way urged to take a different shape, that is, the mount is in a kinetically stable position. That is, the mounted position for the mount 100 is the same as a "normal" unsnapped kinetically stable position. This consistency between this mounted position and a "normal" position reduces the tendency toward partial vacuum loss exhibited by suction mounts such as cone shaped and lever operated mounts.

In operation, embodiments of the mount 100 of the present disclosure work as follows. The mount 100 is snapped to its pre-mounting position (FIG. 4), or is already in its pre-mounting position. The mount 100 is placed on a mounting surface 400, and pressure is exerted on the upwardly extending exterior body portion 104 to rotate the exterior body portion 104 about the circular hinge 106. This motion expands a cavity between the mount and the mounting surface, creating a partial vacuum in the cavity, holding the mount 100 to the mounting surface 400.

To release the mount 100 from its mounted position, pressure is exerted on the main center body portion 103, such as at arrows 502 (FIG. 5). This snaps the mount 100 to its pre-mounting position, returning the cavity 402 to its original size, releasing the partial vacuum in cavity 402, and allowing for dismounting of the mount 100 from the mounting surface 400.

While the mount 100 is shown as having a circular unitary body 102, and the hinge 106 is identified as a circular hinge, it should be understood that different shapes for the unitary body 102 and hinge 106 are amenable to the embodiments of the disclosure without departing from the scope thereof.

Figure 7:
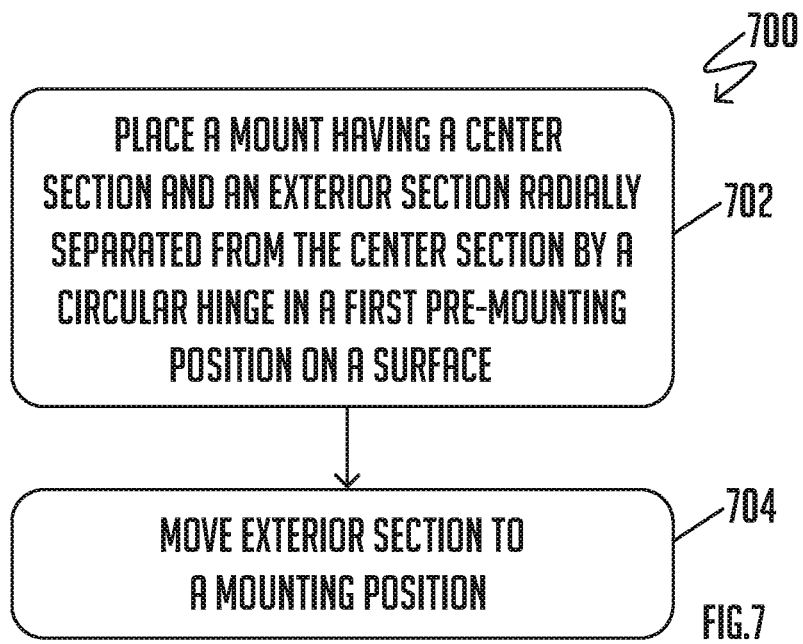
FIG. 7 is a flow chart of a method according to another embodiment of the present disclosure.

A method 700 for mounting a suction device to a mounting surface is shown in flow chart form in FIG. 7. Method 700 comprises, in one embodiment, placing a mount having a center section and an exterior section radially separated from the center section by a circular hinge in a first pre-mounting position on the surface in block 702, the first pre-mounting position configured to extend the exterior section away from the surface, and moving the exterior section to a mounting position in block 704, wherein the mounting position is a position in which the exterior section is rotated about the hinge toward the surface. Moving the exterior section to the mounting position comprises in one embodiment exerting pressure on the exterior section in a direction toward the surface. The pressure may be at one or more points around the circumference of the exterior section, and directed substantially perpendicular to the mounting surface to effect the transition between the first and second positions. The movement of the exterior section to the mounting position expands a cavity between the suction mount and the surface. This expansion is effected in one embodiment by raising the center section through movement of the exterior section from the pre-mounting position to the mounting position.

The material nature of the plastic, that is, its deformability with relative rigidity depending upon the chosen plastic, allows movement of the exterior body portion between positions to involve a quick, snapping movement once a certain amount of deviation from the first position toward the second position or deviation from the second position toward the first position has been induced. The quick, snapping movement from the first pre-mounting position to the second, mounting position assists in the creation of the partial vacuum in the cavity (such as cavity 402) between a mounting surface and an interior portion of the mount. Very little air is introduced into the cavity during the quick movement between the first and the second positions. The gel material further assists in this transition as it is softer than the plastic, and creates a better seal between the mounting surface and the mount than plastic alone.

Figure 8:
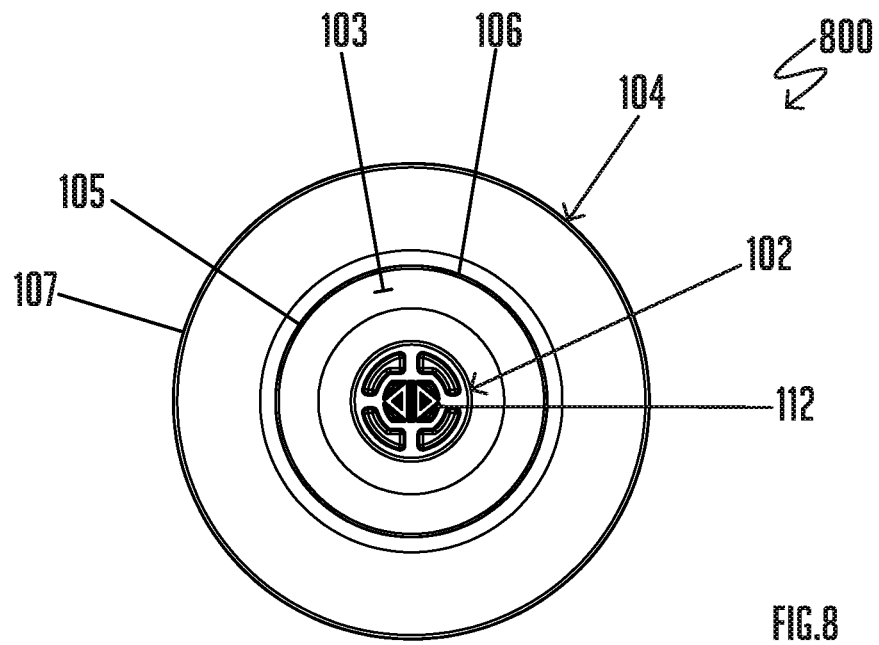
FIG. 8 is a top view of a suction mount according to another embodiment of the present disclosure.

A suction cup mount 800 according to another embodiment of the present disclosure is shown in FIG. 8. Suction cup mount 800 is similar in construction to suction cup mount 100, comprising in one embodiment a unitary body 102 molded in rigid plastic material (in one embodiment polycarbonate), and a gel material 808 coated to a portion of the unitary body 102 on a first side 111 thereof. Unitary body 102 further comprises a main center body portion 103 connected to an exterior body portion 104 by a circular hinge 106, and a mount head 112 formed on the main center body portion. The unitary body 102 of mount 800 includes main center body portion 103 and exterior body portion 104 connected by a circular hinge 106. The mount 800 is flexible about the circular hinge 106. The mount head 112 is used in one embodiment for mounting accessories that hold or secure things ranging from soap dishes and shelves to mobile devices such as a cellular/portable telephone, tablet, book reader, global positioning system, or the like, to the mount 800. The entire structure of mount body 102 is formed as one piece in one embodiment. While polycarbonate is discussed as an option for the plastic of the unitary body, it should be understood that other plastics, including soft or rigid plastic materials, may be used for the unitary body, without departing from the scope of the disclosure.

Figure 9:
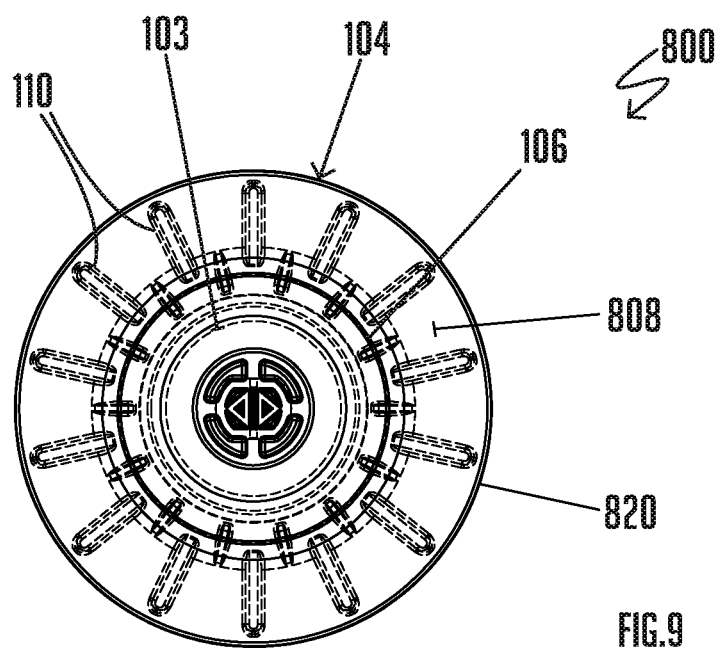
FIG. 9 is a bottom view of the suction mount of FIG. 8.

Referring to FIG. 9, openings 110 are molded into the unitary body 102, in one embodiment internally. In one embodiment, the openings extend substantially perpendicular to the hinge 106 between the main center body portion 103 and the exterior body portion 104. The openings 110 in the body 102 allow for more easy operation of the circular hinge 106, about which the exterior body portion 104 is rotatable with respect to the center body portion 103, flexing about the hinge 106. The structure of the main body 102 allows for the mount 100 to be flexed about the hinge 106 by pressure exerting a moment about the circular hinge 106.

In one embodiment, the unitary body 102 is circular, with the center main body portion 103 concentric with the washer-shaped exterior body portion 104 separated by circular hinge 106. The hinge 106 in one embodiment is thinner than the center main body portion 103. In one embodiment, a thickness of the exterior body portion 104 tapers, from a thickness approximately equal to a thickness of the hinge 106 at its inner edge 105 to a smaller thickness at its outer edge 107, which is in one embodiment also the outer edge of the unitary body 102.

Figure 10:
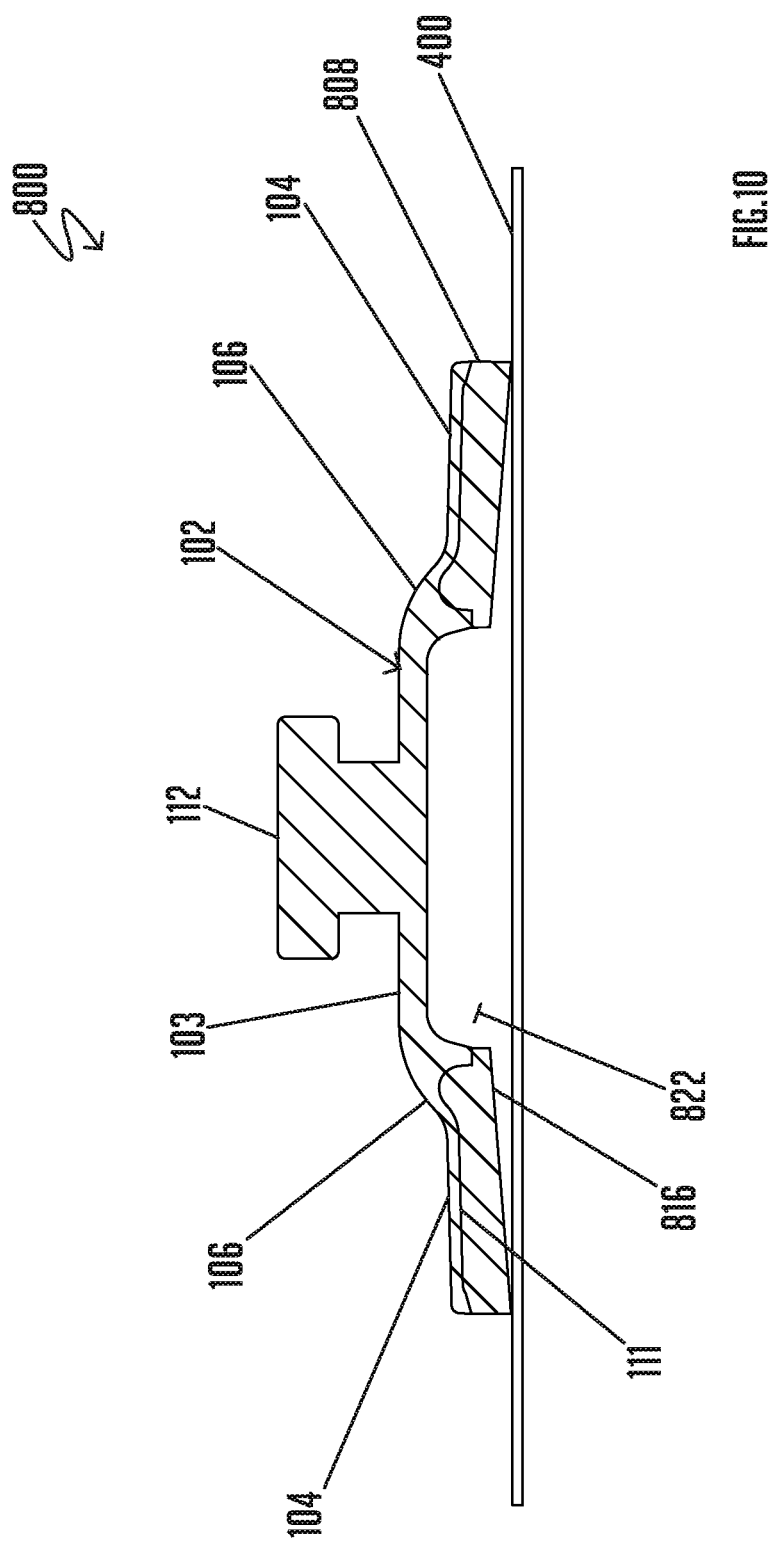
FIG. 10 is a cutaway side view of a suction cup according to embodiment of FIG. 8, in a pre-mounting position.

Gel coating 808 in one embodiment is coupled to at least a portion of the first side 111, and has a bottom surface 816 that contacts a mounting surface 400 at least partially when the mount 800 is about to be mounted to the mounting surface, such as is shown in FIG. 10. The gel coating 808 in one embodiment has a bottom surface 816 that is concave with respect to a surface 400 on which the mount 800 is to be mounted. In the pre-mounting position of the mount 800 as shown in FIG. 10, the gel coating 808 touches the surface 400 around a perimeter 820 of the mount 800.

Figure 11:
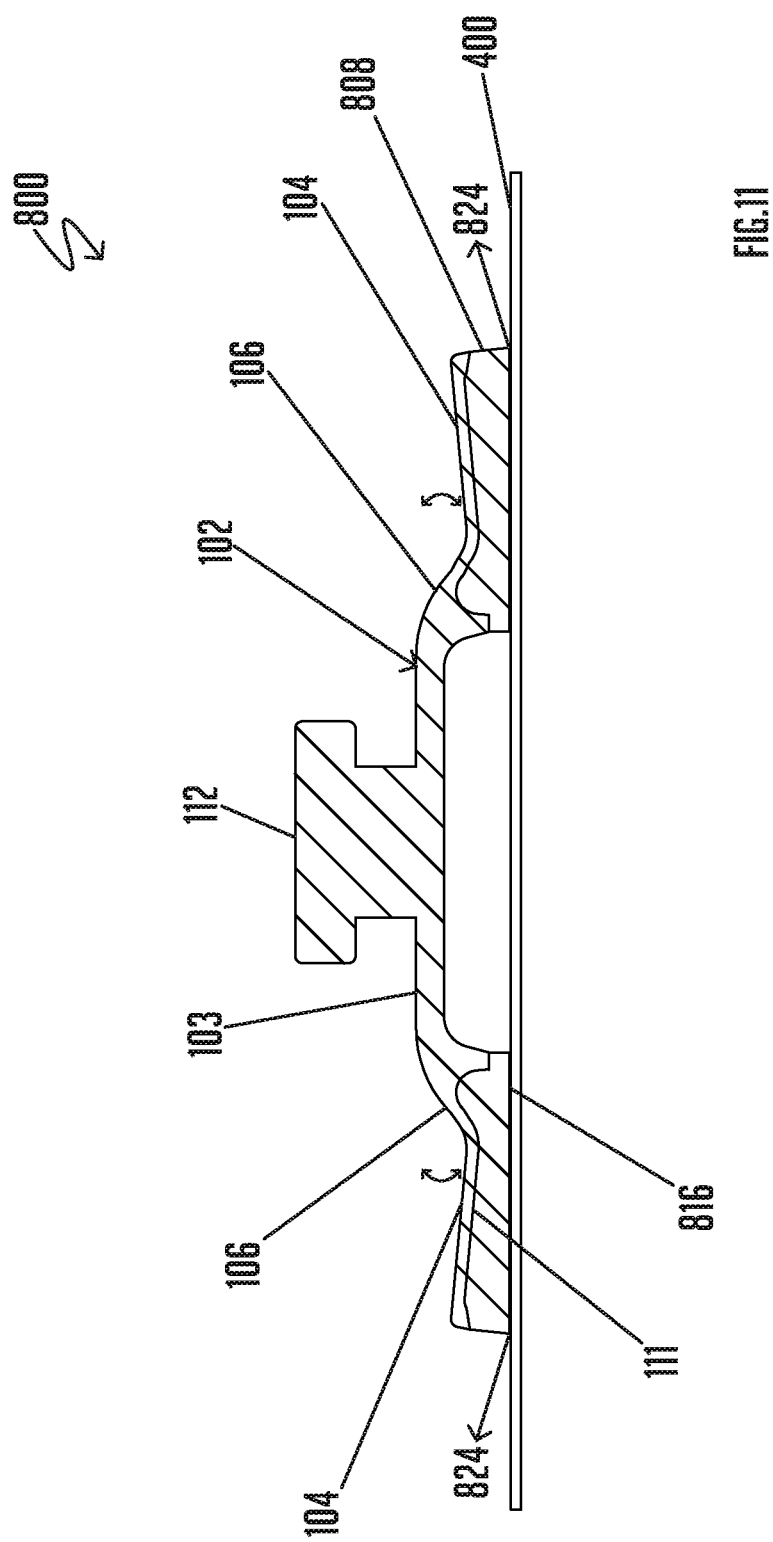
FIG. 11 is a cutaway side view of the suction cup of FIG. 8, in a mounted position.

FIG. 11 shows the mount 800 in a mounted position in which the unitary body 102 has been pressed down toward the mounting surface 400, causing the gel coating 808 to flatten and adhere to the mounting surface 400. In the operation of pressing down the unitary body 102, air that is present in the gap 822 (FIG. 10) between the bottom surface concavity and the mounting surface 400 is forced out as the gap 822 is compressed and reduced. As shown in FIG. 11, air is expelled at the perimeter 820 of the mount 800 between the bottom surface 816 and the mounting surface 400, as shown at arrows 824. It should be understood that the air is expelled radially toward the perimeter, and may be expelled between the gel coating 808 and the mount surface 400 at any number of locations about the perimeter 820, which locations may be different based on the location of any force applied to depress the unitary body 102.

In one embodiment, the unitary body 102 is circular, with the center main body portion 103 concentric with the washer-shaped exterior body portion 104 separated by circular hinge 106. The hinge 106 in one embodiment is thinner than the center main body portion 103. In one embodiment, a thickness of the exterior body portion 104 tapers, from a thickness approximately equal to a thickness of the hinge 106 at its inner edge 105 to a smaller thickness at its outer edge 107, which is in one embodiment also the outer edge perimeter 820 of the unitary body 102.

Once the mount 800 is in its pre-mounting position (FIG. 10) on a surface such as mounting surface 400, to mount the mount 800, the unitary body 102 is pressed toward the mounting surface, the hinge 106 rotates away from the surface 400, and the gel coating 808 is pressed toward the mount surface, reducing the concavity and flattening the gel coating 808 to the mount surface 400. In this process, air is expelled from the gap 822 to create a suction force keeping the mount 800 mounted to the surface 400.

The embodiments of the present disclosure are easy to install and remove from a mounting surface. When formed from rigid plastic material, such as but not limited to polycarbonate, the mount does not deform and stretch. Such rigidity and resistance to deformation and stretching allows the embodiments of the present disclosure to provide improved performance over traditional suction cup mounts, which often fail due to such deformation and stretching.

The gel coating 808 combined with the structure of the mount 800 allows mounting of the mount 800 on surfaces that aren't just smooth. The flexible nature of the gel coating, and the coverage of the coating on the bottom surface of the mount allow for the mount to be more functional on mounting surfaces that are not smooth.

Although the present disclosure has been described with reference to preferred embodiments, workers skilled in the art will recognize that changes may be made in form and detail without departing from the spirit and scope of the disclosure.

What is claimed is:

1. A suction device configured for mounting to a mounting surface, the suction device comprising:
    a unitary body having a center main body portion and an exterior body portion, the unitary body having a first side configured to face the mounting surface, the exterior body portion having a bottom surface, the center main body portion and the exterior body portion connected by a hinge, the exterior body portion having an inner edge proximal to the hinge and an outer edge distal to the hinge, and the exterior body portion extending fully from the hinge to the outer edge; and
    a gel material covering a substantial portion of the bottom surface of the exterior body portion, the gel material tapering from the inner edge of the exterior body portion to the outer edge of the exterior body portion, and the gel material having a bottom surface configured to contact the mounting surface;
    wherein the exterior body portion is movable between a first pre-mounting position in which the center main body portion and the exterior body portion form a substantially convex shape on the first side of the unitary body, and a second mounted position in which the center main body portion and the exterior body portion form a substantially concave shape on the first side of the unitary body;
    wherein, when the exterior body portion is in the first pre-mounting position, an inner end of the bottom surface of the gel material is configured to contact the mounting surface while an outer end of the bottom surface of the gel material is configured to be spaced from the mounting surface;
    wherein, when the exterior body portion is in the second mounted position, the bottom surface of the gel material is configured to be substantially parallel to the mounting surface; and
    wherein the center main body portion is configured to be substantially parallel to the mounting surface when the exterior body portion is in each of the first pre-mounting position and the second mounted position.

2. The suction device of claim 1, wherein the unitary body is disc-shaped.

3. The suction device of claim 1, wherein the hinge is a circular hinge.

4. The suction device of claim 1, wherein the unitary body is formed of polycarbonate.

5. The suction device of claim 1, wherein the unitary body contains a plurality of molded internal openings therein, the internal openings positioned substantially perpendicular to the hinge, and the internal openings configured to assist movement of the exterior body portion between the first pre-mounting position and the second mounted position.

6. The suction device of claim 1, wherein the center main body portion further comprises a mount head configured to mount a device thereto.

\* \* \* \* \*